US009861034B2

(12) United States Patent
Skinner

(10) Patent No.: US 9,861,034 B2
(45) Date of Patent: Jan. 9, 2018

(54) TRIMMER HEAD WITH INCORPORATED LINE CUTTER

(71) Applicant: Shakespeare Company, LLC, Columbia, SC (US)

(72) Inventor: David B. Skinner, Columbia, SC (US)

(73) Assignee: Shakespeare Company, LLC, Boca Raton, FL (US)

( * ) Notice: Subject to any disclaimer, the term of this patent is extended or adjusted under 35 U.S.C. 154(b) by 124 days.

(21) Appl. No.: 15/088,608

(22) Filed: Apr. 1, 2016

(65) Prior Publication Data

US 2016/0286717 A1 Oct. 6, 2016

Related U.S. Application Data

(60) Provisional application No. 62/166,772, filed on May 27, 2015, provisional application No. 62/141,407, filed on Apr. 1, 2015.

(51) Int. Cl.
 *B62D 1/02* (2006.01)
 *A01D 34/416* (2006.01)
 *B26D 1/02* (2006.01)

(52) U.S. Cl.
 CPC ....... *A01D 34/4166* (2013.01); *A01D 34/416* (2013.01); *B26D 1/02* (2013.01); *B26D 2210/00* (2013.01)

(58) Field of Classification Search
 CPC .... A01D 34/4166; A01D 34/416; B26D 1/02; B26D 2210/00
 See application file for complete search history.

(56) References Cited

U.S. PATENT DOCUMENTS

| | | |
|---|---|---|
| 4,051,756 A | 10/1977 | Bognar et al. |
| 4,052,789 A | 10/1977 | Ballas, Sr. |
| 5,203,083 A | 4/1993 | Domonoske |
| 5,890,291 A | 4/1999 | Crum |
| 5,946,997 A | 9/1999 | Nicholson, Jr. |
| 6,401,344 B1 | 6/2002 | Moore et al. |
| 7,111,403 B2 | 9/2006 | Moore |
| 7,305,910 B1 | 12/2007 | Bermes |
| 7,908,953 B2 | 3/2011 | Yarborough et al. |
| 2004/0093736 A1 | 5/2004 | Kuo |
| 2008/0116218 A1 | 5/2008 | Iacona |
| 2011/0313430 A1 | 12/2011 | Miller |
| 2013/0092584 A1 | 4/2013 | Sheehy et al. |

*Primary Examiner* — Sean Michalski
(74) *Attorney, Agent, or Firm* — Eversheds Sutherland (US) LLP

(57) ABSTRACT

A trimmer head for a rotary trimmer, includes an upper housing and a lower housing secured to the upper housing, wherein either the upper housing or the lower housing has a passageway. The trimmer head also includes a cutter assembly maintained in the passageway, wherein the cutter assembly has a knife, and wherein trimmer line inserted into the passageway is cut by the knife. A related method of cutting a trimmer line using the cutter assembly incorporated into a trimmer head is also disclosed.

23 Claims, 23 Drawing Sheets

TRIMMER HEAD WITH INCORPORATED LINE CUTTER

CROSS-REFERENCE TO RELATED APPLICATIONS

This application claims priority of U.S. Provisional Application Ser. Nos. 62/141,407 filed Apr. 1, 2015 and 62/166,772 filed May 27, 2015, both of which are incorporated herein by reference.

TECHNICAL FIELD

The present invention is generally related to trimmer heads. More specifically, the present invention is directed to trimmer heads which incorporate a line cutter into the trimmer head itself. More specifically, the present invention is directed to a trimmer head wherein the line cutter is recessed within the trimmer head and which may have a deflectable door to permit access to a knife.

BACKGROUND ART

Vegetation trimming devices are well known and are commonly used to maintain one's lawn and garden. There are a number of different classes of rotary trimmer heads defined generally by the manner in which a monofilament trimmer line is fed, spooled or replaced in the trimmer head and/or how the trimmer line is discharged, indexed or lengthened during use of the trimmer head. Regardless of the type of trimmer head, almost all trimmer heads require the user to cut a portion of the trimmer line from a master spool or package. The cut trimmer line can then be installed in the head for use in cutting vegetation.

One class of rotary trimmer head is a bump-activated trimmer head. A second class of rotary trimmer head is a "fixed-line" trimmer head. The majority of after-market trimmer heads for rotary trimmers that are sold are fixed-line trimmer heads. These types of trimmer heads are easily designed to be universally adaptable to essentially any brand of rotary trimmer regardless of the operation of the trimmer head or the direction of rotation. Such trimmer heads utilize a housing which has a series of spaced line holders or an easy means or inserting, holding and/or removing multiple trimmer lines. As the line wears, the consumer must cut a new piece of trimmer line and manually insert the new length of trimmer line into a line channel maintained within the trimmer head. The consumer controls the length of the line that is inserted. Such trimmer heads have gained wide acceptance in the market in view of their ease-of-use.

There are a number of options available to cut the trimmer line to a desired length. The consumer may carry a knife or pair of scissors with them to cut the line to length or, as usually happens, the consumer must return to their house or garage and find an implement with a sharp edge and then cut the line to length. Taking a break from the task of trimming for the purpose of finding an implement to cut the trimmer line can be frustrating. Walking into one's house with debris on one's clothing can lead to making a mess in the house, and the trimmer machine must be left outside unattended.

It is also known to provide a knife member on a housing for a rotary trimmer as shown and described in U.S. Pat. No. 4,052,789. However, original equipment manufacturers are not offering this feature.

Still another option for cutting a trimmer line to length is to provide a package in which the trimmer line is sold with a cutting implement as is disclosed in U.S. Pat. No. 9,266,698, which is incorporated herein by reference, entitled "Package For Monofilament Line With Embedded Cutting Tool And Related Method." While this option does provide a level of convenience, not all packages of trimmer line are sold with integrated cutters.

The last two options do provide a level of convenience; however, there is a need in the art for a trimmer head incorporating a cutter which will readily provide a convenience means for trimming monofilament trimmer line at the point of use and will work with any package of trimmer line.

SUMMARY OF THE INVENTION

In light of the foregoing, it is a first aspect of the present invention to provide a trimmer head with incorporated line cutter.

It is another aspect of the present invention to provide a trimmer head for a rotary trimmer, the trimmer head comprising an upper housing, a lower housing secured to the upper housing, wherein either the upper housing or the lower housing has a passageway, and a cutter assembly maintained in the passageway, the cutter assembly having a knife, wherein trimmer line inserted into the passageway is cut by the knife.

Still another aspect of the present invention is to provide a rotary trimmer head, comprising at least one housing having a passageway inwardly extending from an external surface of the at least one housing; and a knife maintained within the passageway, wherein the knife is adapted to cut a trimmer line inserted into the passageway.

It is yet another aspect of the present invention to provide a method of cutting a length of trimmer line, using a rotary trimmer head having a passageway with a recessed knife, the method comprising folding a trimmer line, inserting the folded trimmer line into the passageway to engage the recessed knife; and cutting the folded trimmer line into two pieces of trimmer line.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
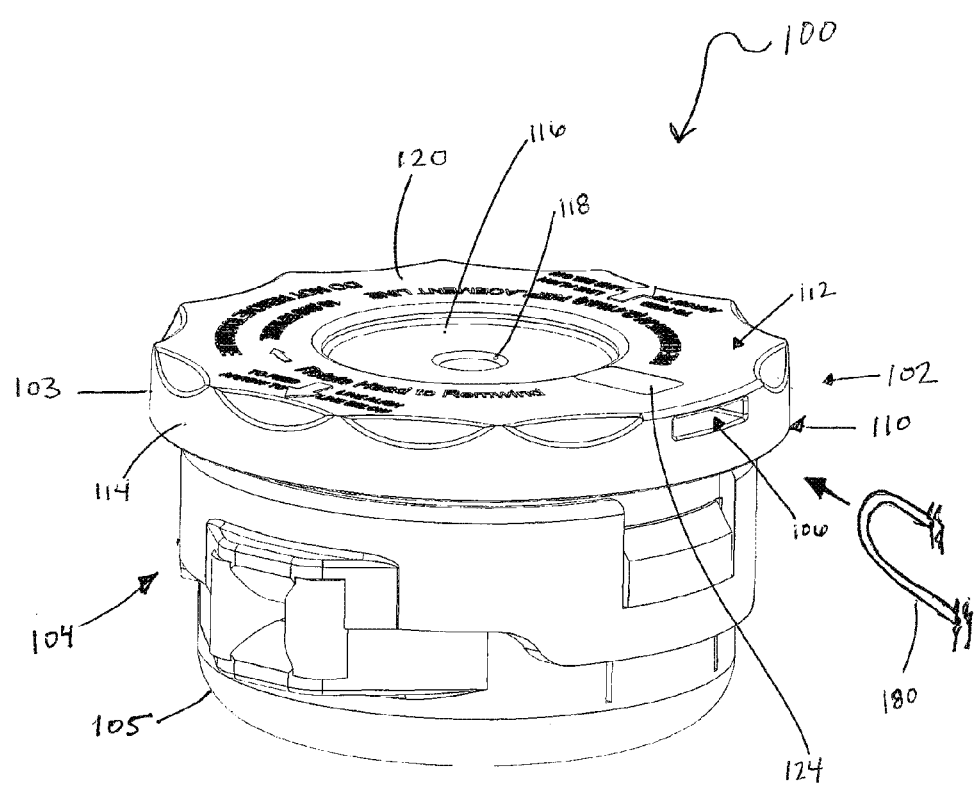
FIG. 1 is a perspective view of a bump-activated trimmer head with an incorporated line cutter according to the concepts of the present invention.

As seen in the drawings, there are a number of different variations of a trimmer head with an incorporated line cutter. The first embodiment discussed below is a bump-activated trimmer head designated general by numeral 100. Bump-activated trimmer heads are described in U.S. Pat. Nos. 6,952,877; 7,607,232; and 7,979,991. However, the prior art does not teach the incorporation of a line cutter into the trimmer head. By adding a line cutter to the product, a greater level of convenience is afforded the user.

Referring now to FIGS. 1-5, the trimmer head designated generally by the numeral 100 can be seen. The trimmer head shown in FIG. 1 is referred to as a bump-feed or bump-activated trimmer head. The head is mounted onto a trimmer machine (not shown) and loaded with trimmer line by the user. The rotating trimmer head with line extending can cut vegetation as discussed in the prior art. As the line becomes worn, the head can be bumped on the ground to release additional lengths of trimmer line. Eventually a new strip of trimmer line must be loaded into the head.

The trimmer head 100 includes an upper portion 102, which may also be referred to as an upper housing, that may be mateably connected or secured to a lower portion 104, which may also be referred to as a lower housing. In this embodiment, the upper portion provides for a passageway 106. The lower housing 104 slidably receives a bump-head 105. As is well understood, actuation of the bump-head 105 facilitates the release of internally-wound trimmer line. In particular, a length of trimmer line is cut and then threaded through one eyelet and then into an internal line channel. The line channel provides a passageway for the line to travel to the opposite eyelet. The user pushes the line until it exits the second eyelet. Next the trimmer line is pulled so that equal lengths of line extend from each eyelet. Then the user turns the upper housing 102 while holding the lower housing 104 stationary. This action causes a length of trimmer line (not shown) to be wound onto a spool internal to the head 100 and thus maintained within the trimmer head 100. The user will "bump" the trimmer head as it rotates so as to release a portion of the line. If too much line is released, the line is trimmed by a knife that is held by a guard held by the trimmer. When such a trimmer head 100 is utilized, the length of line that is wound within the trimmer head is typically 10 to 20 feet long and must be cut from a spool that carries a large quantity of trimmer line.

Figure 2:
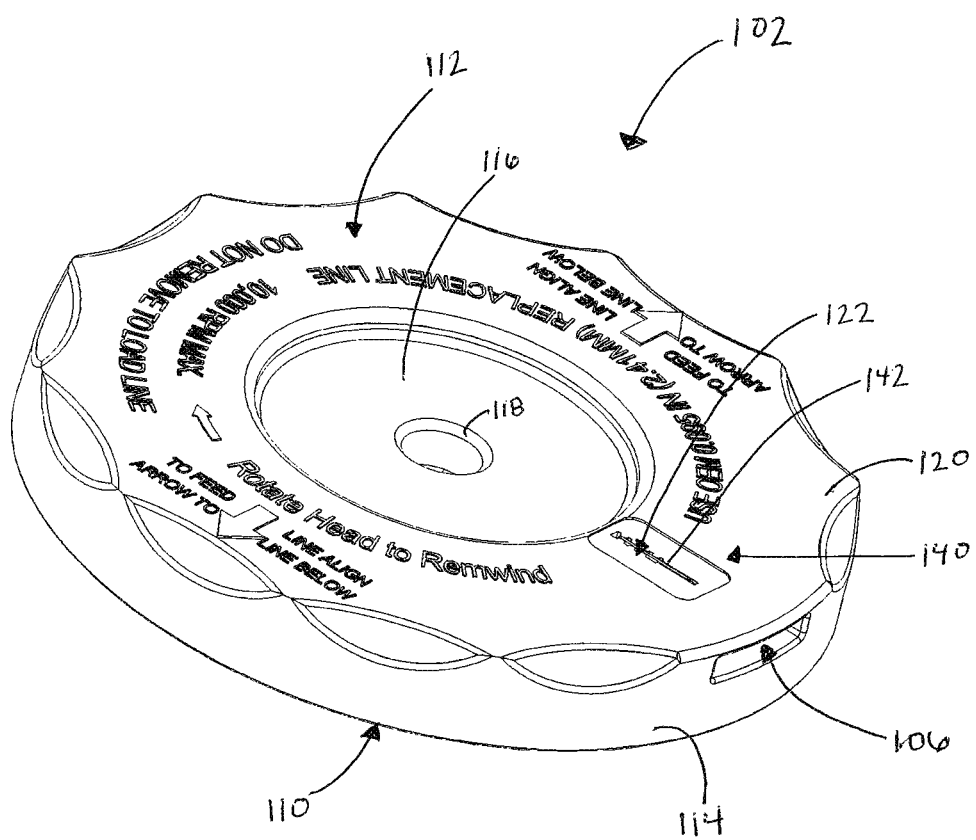
FIG. 2 is a top perspective view of the upper portion of the trimmer head shown in FIG. 1 with a cutter incorporated.

The upper portion 102 includes a body portion 110 which is of a substantially circular configuration. The body portion 110 provides for a facing surface 112 from which substantially perpendicularly extends an external surface 114 which may also be referred to as a sidewall. The facing surface 112 further provides for a sunken hollow 116 with a central passageway 118. Skilled artisans will appreciate that a threaded motor shaft (not shown) passes through the central opening 118 and connects to a fastener constrained in a central upper portion of the lower housing 104 as shown in FIG. 2. This connection allows for rotation of the trimmer head 100.

A facing ring 120 may be provided between the sunken hollow 116 and the external surface 114. Radially extending from an inner edge of the facing ring 120, proximally near the sunken hollow 116, toward the external surface 114 may be a recess 122. The recess 122 may be covered by a label with an adhesive backing for reasons which will be explained later.

The passageway 106 may be formed in the external surface 114 of the upper housing 102. In the passageway 106 is a cutter assembly 140 which may be integrally molded into the upper portion 102 of the trimmer head. The cutter assembly 140 includes a blade 142, which may be referred to as a knife, which is received in the recess 122 wherein the blade 142 includes a sharp edge 144 which faces radially outward in the interior of the passageway 106. Skilled artisans will appreciate that the blade 142 may also be in the form of a hook or straight blade wherein the sharp edge 144 faces radially inward in the interior of the passageway. Other knife configurations may be employed.

Figure 3:
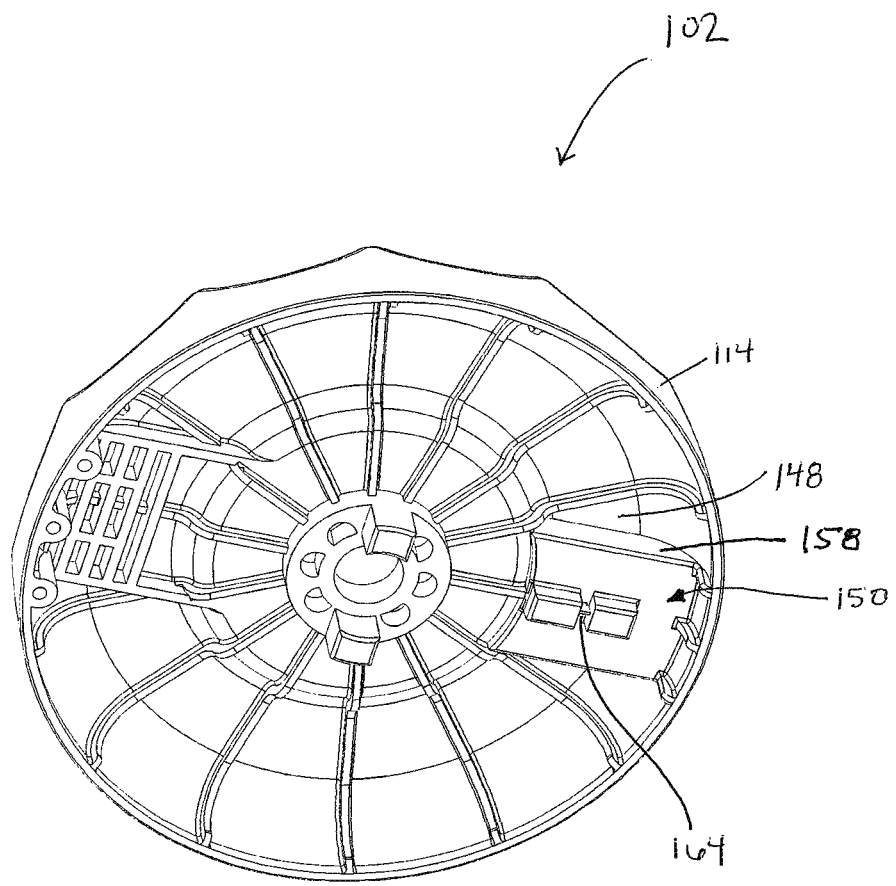
FIG. 3 is a bottom perspective view of the upper portion of the trimmer head shown in FIG. 1.
Figure 4:
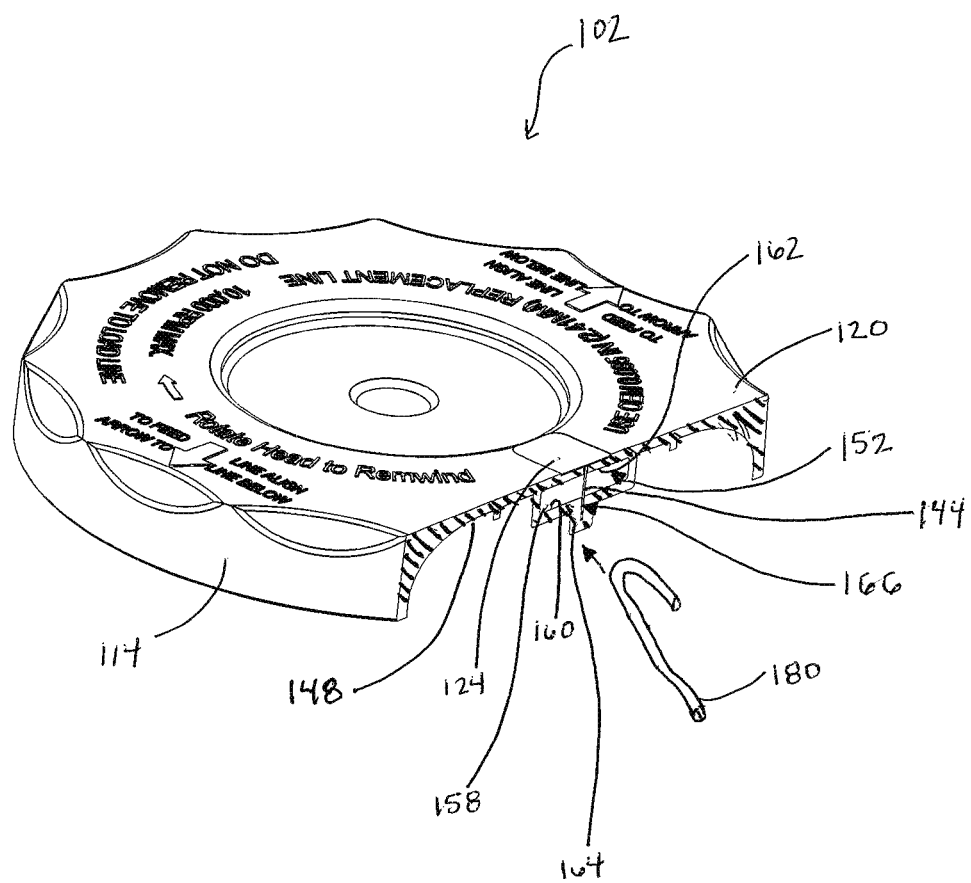
FIG. 4 is a perspective view in partial cross-section of the trimmer head's upper portion.

As seen in FIGS. 3 and 4, the upper portion 102 of trimmer head 100 provides for an underside 148. Extending from the upper portion underside are cutter sides 158 which form a cutter housing 150. The cutter housing 150 maintains a cutter cavity 152 that is contiguous with the passageway 106.

Figure 5:
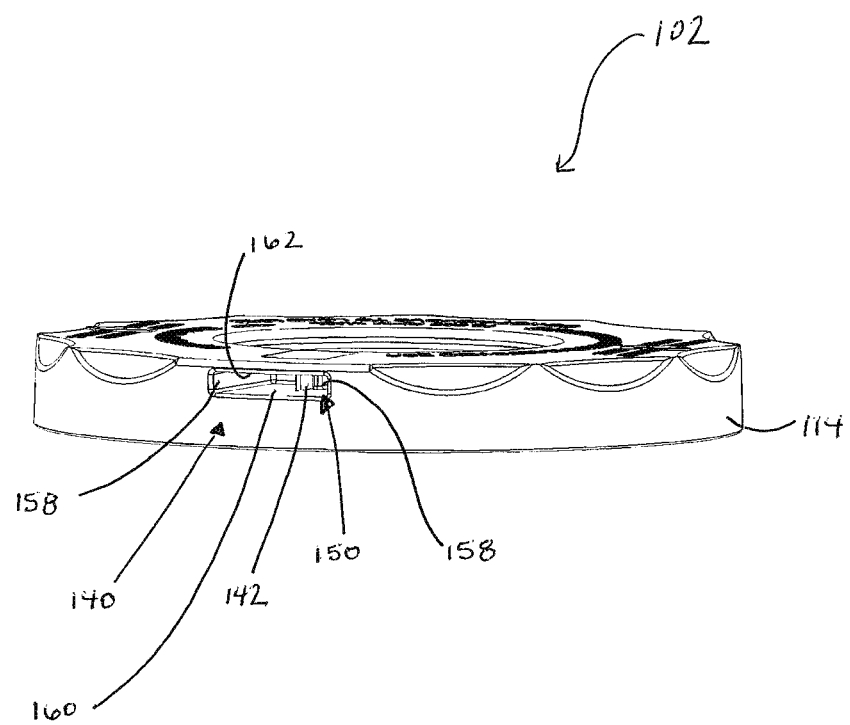
FIG. 5 is a side perspective view of the trimmer head's upper portion.

As best seen in FIGS. 4 and 5, the cutter housing 150 provides for the sides 158 which extend from an underside of a facing surface 120. The cutter sides 158 are terminated at a cutter floor 160 which connects the sides 158 to one another. A cutter ceiling 162 is formed by the underside of the facing surface 120 which also connects the sides 158 to one another. Skilled artisans will appreciate that the floor and ceiling may be referred to interchangeably. Together, the sides 158, the floor 160 and the ceiling 162 form the cutter cavity 152. A housing rib 164 extends from the floor 160 in a direction away from the facing surface 120. The housing rib 164 provides for a trough 166 which is aligned with the recess 122. In other words, the trough 166 and the recess 122 are aligned with one another and radially extend in substantially the same direction from the inner diameter of the facing ring 120 toward the outer diameter of the facing ring, i.e., the external surface 114. As such, one lateral edge of the knife 142 is frictionally held in place by the recess 122 and the opposite lateral edge of the knife may be received and positionally held in the trough 166.

As best seen in FIGS. 1 and 4, an outer-edge of a folded trimmer line 180 may be inserted into the passageway 106 so as to engage the cutter assembly 140. The cutter assembly 140 may be recessed from the external surface 114. This feature prevents the sharp edge 144 from coming in contact with the user's fingers as they are typically larger in diameter than the trimmer line. Indeed, the passageway may be sized so as to only allow for folded trimmer line of a predetermined diameter to be inserted. If needed, the label 124 can be removed from the facing ring and the blade 142 can be removed in the event the sharp edge 144 becomes dull over a period of use. A new blade 142 may then be inserted into the recess and the trough and re-covered with the label.

Figure 6A:
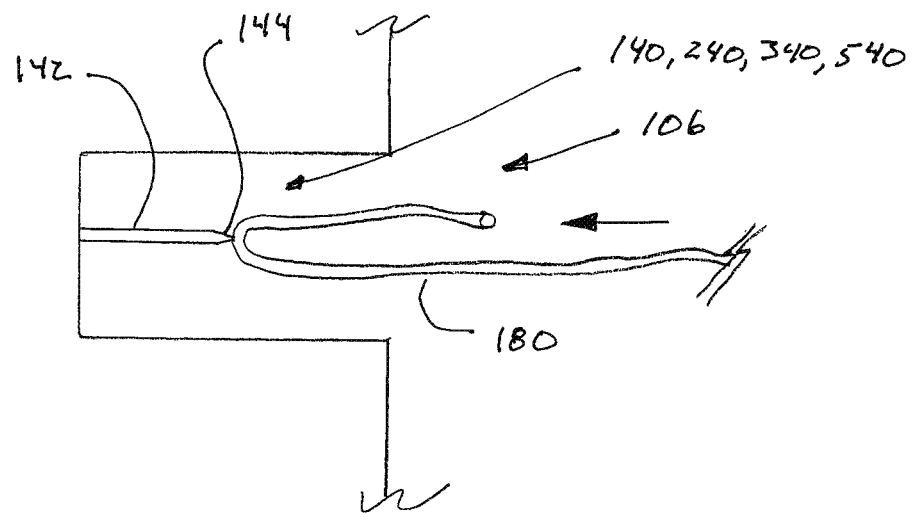
FIG. 6A is a schematic diagram showing a folded trimmer line about to be cut by a knife.
Figure 6B:
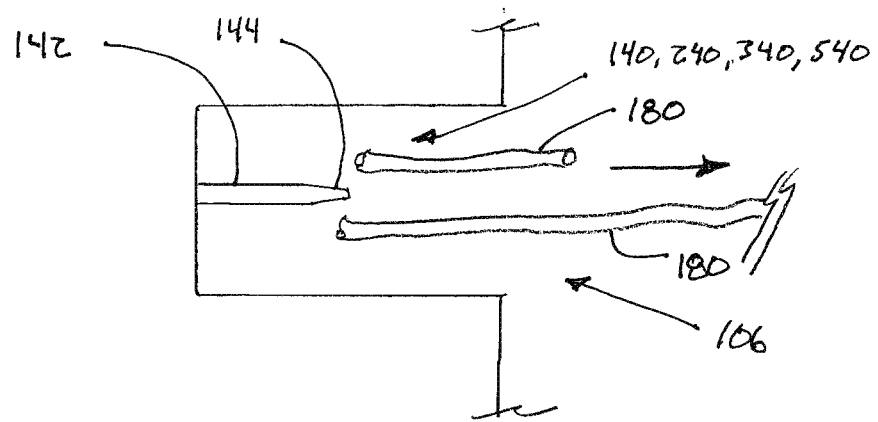
FIG. 6B is a schematic diagram showing the trimmer lines after being cut by the knife.
Figure 7:
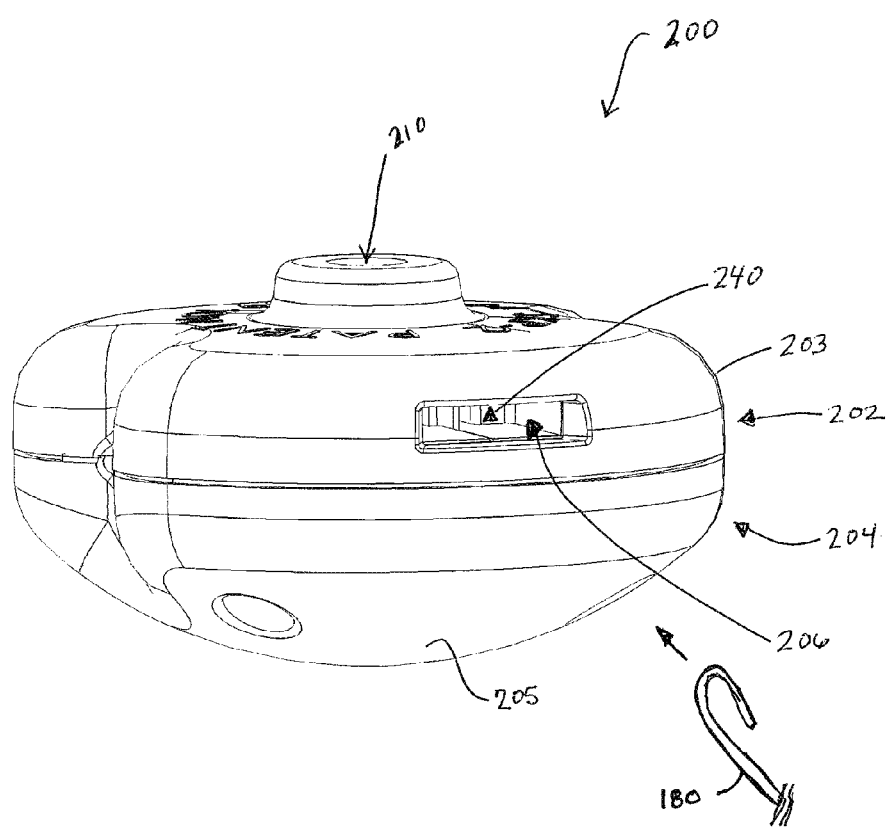
FIG. 7 is an alternative embodiment of a fixed-line trimmer head with an incorporated line cutter according to the concepts of the present invention.

As best seen in FIGS. 6A and 6B, the steps used for cutting the trimmer line using the various embodiments of the present invention are schematically shown. In FIG. 6A it can be seen that the cutter assembly 140, and also the cutter assemblies 240, 340 and 540, maintain the knife blade 142 in a recessed position. The folded trimmer line 180 is inserted into the passageway and the cutter assembly so that an outer edge of the fold comes in contact with the knife edge 144. Application of a further insertion force causes the edge 144 to shear, cut or otherwise cleave the trimmer line into two pieces of trimmer line. After the trimmer line is cut, as shown in FIG. 6B, the two trimmer line pieces are removed. In embodiments where the blade is in the form of a hook or straight blade which does not span completely from the floor to the ceiling of the cutter housing with the sharp edge facing inwardly, the folded trimmer line is inserted into the passageway such that an interior edge of the loop is positioned over the blade and then pulled to force the interior edge of the loop against the edge which then cuts the folded trimmer line into two pieces.

In general, all of the remaining embodiments have a housing assembly that is secured to a rotatable motor shaft of a trimmer machine's motor. In several embodiments, a lower housing is attached to a upper housing. The embodiments hold one or more strips of trimmer line in a manner that is well known in the art. In the embodiments disclosed, either the upper housing and/or the lower housing provide a passageway for receiving a folded trimmer line. In most embodiments the passageway is of a rectangular shape wherein the passageway is wider in a first orientation than in a second orientation. However, the passageway may be of any shape or configuration that will allow the folded trimmer line to be inserted. Maintained within the passageway is a cutter assembly that includes a knife. The knife may be recessed from an outer surface of the housing. In most embodiments, the knife may be oriented in the second narrower orientation. In use, a consumer inserts the folded portion of trimmer line into the passageway so as to engage the knife which cuts the outer edge of the folded portion of trimmer line. Alternatively, the knife may be inwardly facing and the loop of folded trimmer line is placed over the knife and then pulled to cut the trimmer line in two. Details of each variation will be presented below; however, unless specifically stated otherwise, the features in any one of the embodiments may be used in any of the other embodiments.

Referring now to FIGS. 7-11, it can be seen that an alternative trimmer head is designated generally by the numeral 200. The trimmer head 200 is a fixed-line type wherein a single trimmer line may be secured within trimmer head 200. The distal ends of the line extend from opposite sides of the trimmer head, thus providing two portions of the line for trimming vegetation. In general, the means of clamping the single strip of trimmer line is described in the prior art in U.S. Pat. Nos. 6,401,344 and 7,111,403, hereby included in their entirety by reference. Improvements have been made to design over prior commercial embodiments, including but not limited to the addition of a removable line cutter accessible through the wall of the improved trimmer head.

Figure 8:
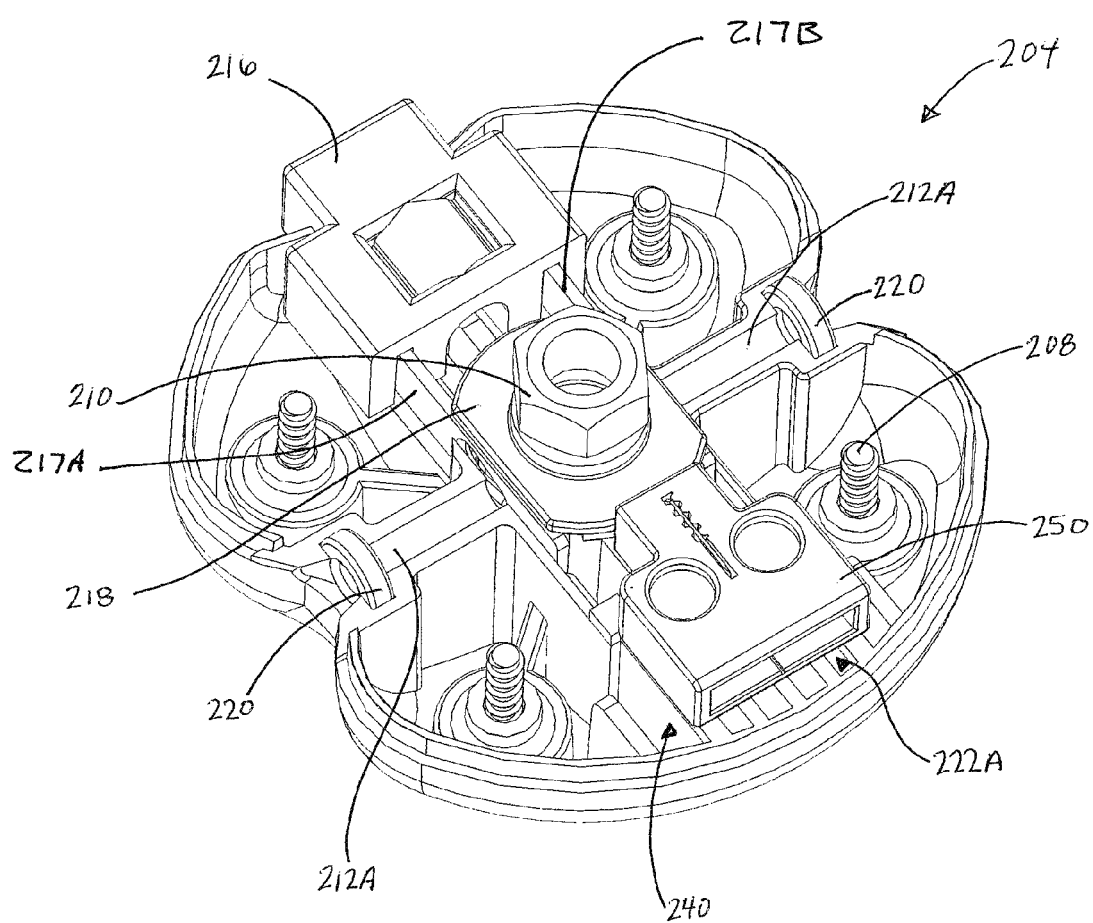
FIG. 8 is a perspective view of the lower housing assembly of the alternative trimmer head shown in FIG. 7.
Figure 11:
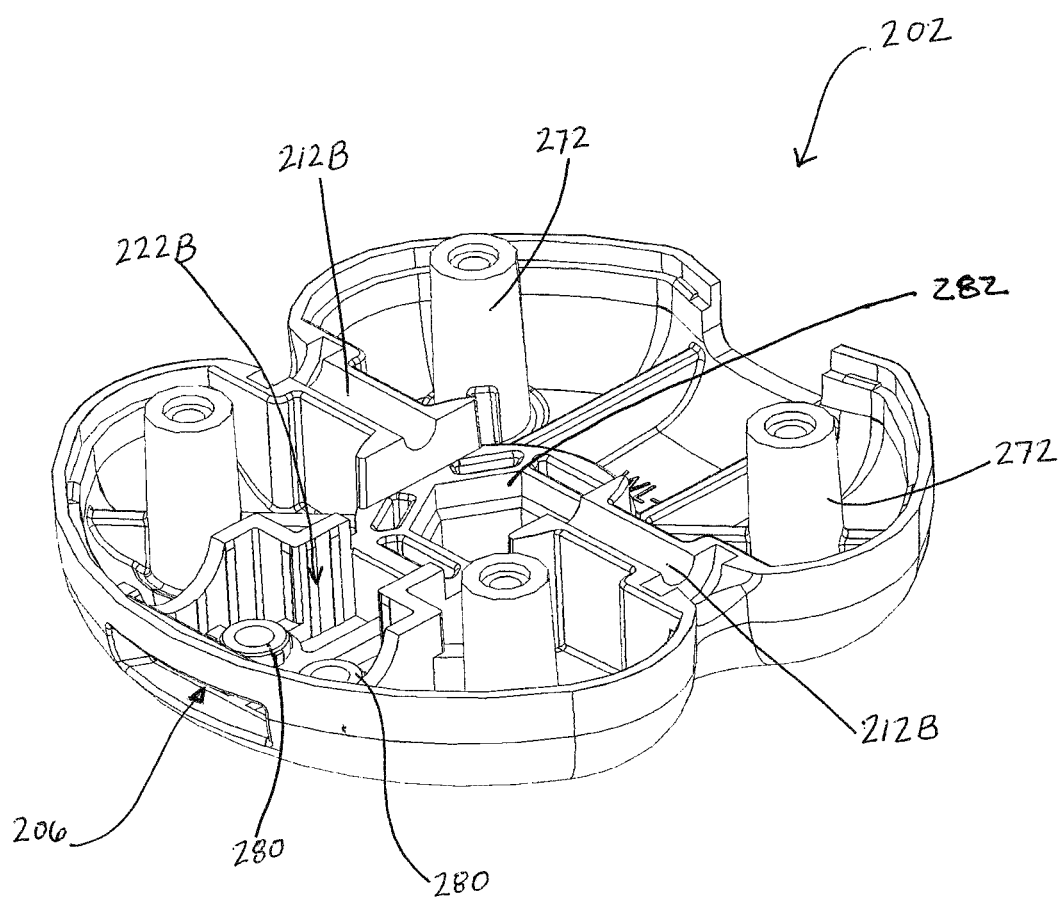
FIG. 11 is a bottom perspective view of the upper housing utilized in the alternative trimmer head shown in FIG. 7.
Figure 12:
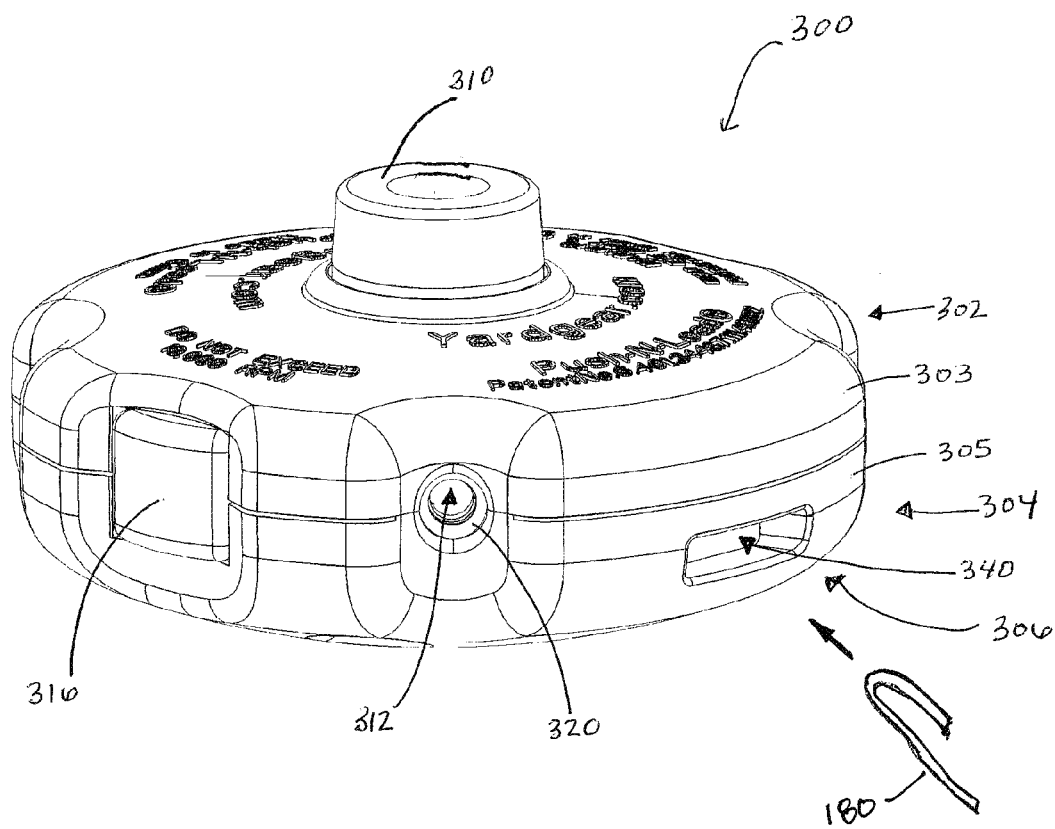
FIG. 12 is a perspective view of a second alternative embodiment of a fixed-line trimmer head with an incorporated line cutter according to the concepts of the present invention.

The assembled trimmer head 200 comprises a lower housing 204 shown assembled with other components in FIG. 8, and an upper housing 202 shown in FIG. 11. In the embodiment shown, the upper housing 202 has an external surface 203 which provides for a passageway 206. However, it will be appreciated that the passageway 206 may be provided in the lower housing 204 which has an external surface 205. Contained within the trimmer head 200 is a cutter assembly 240 which is accessible through the passageway 206.

As best seen in FIG. 8, the lower housing 204 provides for a plurality of fasteners 208. Additionally, a threaded fastener 210 is utilized to attach the trimmer head to a trimmer machine. A threaded nut is shown, but the fastener could also be a bolt. With the housings 202 and 204 assembled to one another, the threaded fastener 210 is rotationally constrained by the hexagon-shaped cavity 282 located in the center of the upper housing 202. In this example, the fastener 210 connects to a motor shaft (not shown) which is extended through the passageway so as to allow for rotation of the trimmer head 200 by the motor.

In any event, the lower housing 204 provides for a lower channel 212A. The upper housing 202 provides for an upper channel 212B. When the upper and lower housings are assembled, then two upper channel portions 212B and the two lower channel portions 212A are aligned to form a passageway from one side of the trimmer head to the opposite side. Eyelets 220 at the outer end of each channel 212A and 212B protect the integrity of the channel. An arbor 218 is positioned in the center of the head. This arbor 218 contains a through bore which is aligned with and similarly sized as the combined upper and lower channel portions 212A and 212B. A trimmer line retention button 216 is provided at one side of the housings and is operatively connected to two metal posts 217A and 217B. These two metal posts each have a pear-shaped opening. The retention button, and thus these posts 217A and 217B are biased outwardly towards the perimeter of the trimmer head. In the outward position, the pear-shaped openings are not aligned with the passageway from by the channel portions 212A and 212B. However, when the retention button is pressed, a spring (not shown) is compressed and then the pear-shaped openings align with the channel portions 212A and 212B and with the through bore in the arbor 218. When the posts 217A and 217B are in this second position, then a strip of trimmer line can be inserted through the first eyelet, through the passageway described above and out the second eyelet.

Once the trimmer line is properly positioned for use, then the button 216 can be released. The biasing spring pushes on the button 216 which pulls the metal posts 217A and 217B outward. This causes the pear-shaped openings in these two posts to pinch the trimmer line and thus to hold the line in position during the operation of the trimmer head for cutting vegetation. The operation of this line clamping mechanism is further described in U.S. Pat. No. 7,111,403, which is incorporated herein by reference.

The lower housing 204 provides for a lower cutter support surface 222A which receives and constrains the cutter assembly 240. The upper housing 202 contains a cavity 222B for constraining the opposite side of the cutter assembly. In this embodiment, the cutter assembly 240 is aligned with the passageway 206 located in the upper housing, thus providing access to the cutter assembly via this passageway.

Figure 9:
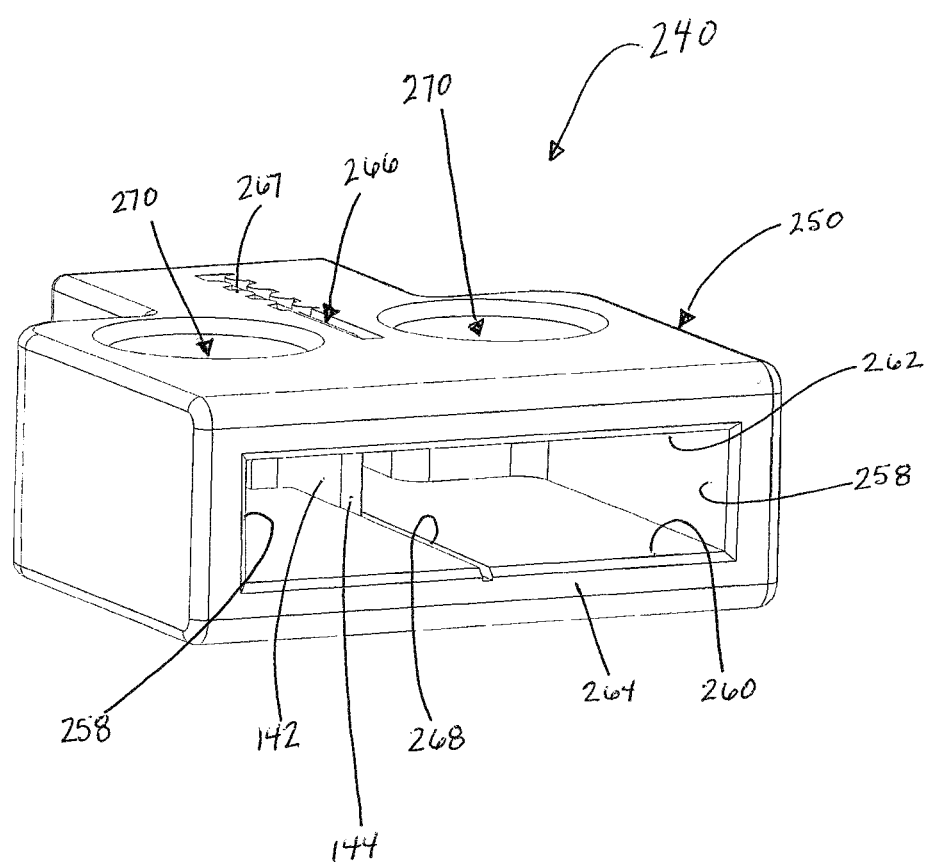
FIG. 9 is a perspective view of a cutter assembly maintained within the alternative trimmer head shown in FIG. 7.
Figure 10:
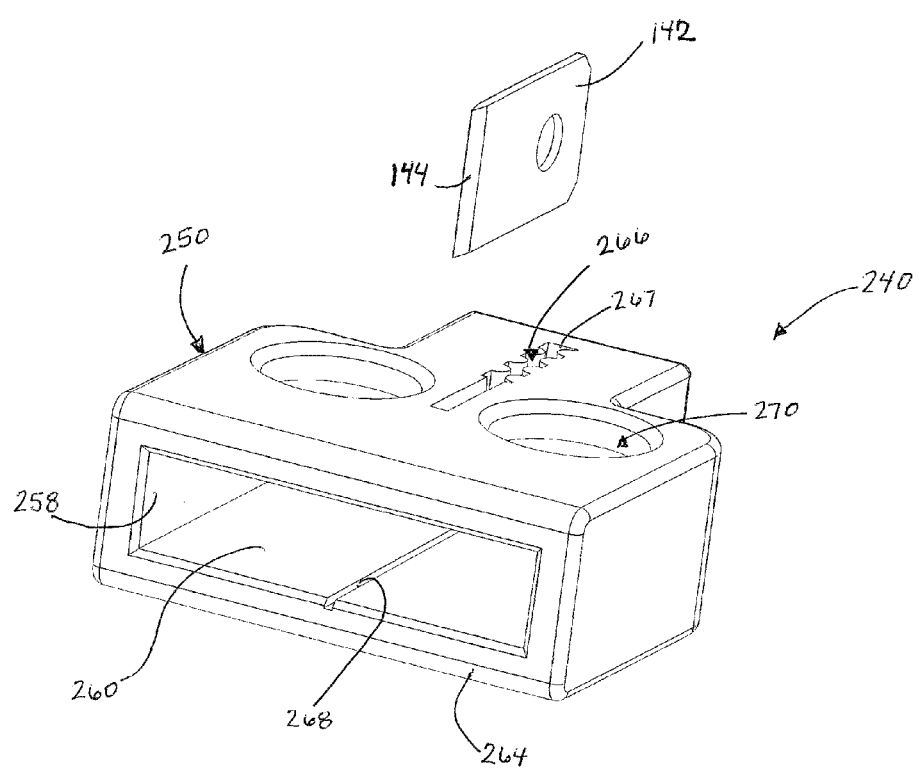
FIG. 10 is an exploded perspective view of the cutter assembly shown in FIG. 9.

Referring now to FIGS. 9 and 10, it can be seen that the cutter assembly 240 includes a cutter housing 250. The cutter housing 250 is constructed from a pair of opposed sides 258 which are connected to one another at their lower edges by a cutter floor 260. In a similar manner, a cutter ceiling 262 connects the top edges of the cutter sides 258 to one another. The cutter housing 250 has a housing front 264, but in some embodiments the recess may extend to the front. The cutter ceiling 262 includes a recess 266 extending from a rear portion of the cutter housing 250 toward the housing front 264, but the recess does not reach the housing front 264. It will also be appreciated that the recess 266 may be formed with a series of ribs on either side that face one another. This provides for a frictional fit between the surfaces of the blade 142 so that the blade can be assembled to the cutter body by inserting it through the top surface 262. The cutter floor 260 may provide for a trough 268 which is aligned with the recess 266 provided by the cutter ceiling 262. The blade 142 is received in the recess 266 such that a lower edge of the blade may be received in the trough 268. The knife 142 substantially bisects the cutter housing 250 and also the passageway 206 wherein the sharp edge 144 may be set back from the housing front 264. The cutter housing 250 may also provide for positioning cavities 270. The positioning cavities 270 as shown in FIG. 9 are of a circular configuration but skilled artisans will appreciate that any shape may be employed. It will further be appreciated that any number of cavities 270 may be provided.

FIG. 11 shows the inside of the upper housing 202 wherein a plurality of posts 272 are aligned with the fasteners 208 carried in the lower housing 204 (shown in FIG. 8). As such, the upper and lower housings are secured to one another by the fasteners 208 being received in the posts 272. The inside of the upper housing is provided with a cutter cavity 222B so as to receive the cutter assembly 240. Positioning posts 280 may be provided in the cutter cavity 222B and these posts are received in the positioning cavities 270. As a result, the cutter housing 250 is securely received and positioned between the cutter floor 222A and the cutter cavity 222B when the housings are assembled to one another.

In this embodiment, it will be appreciated that the cutter assembly 240 is removable whenever the housings are disassembled from one another. As such, whenever the sharp edge 144 of the blade 142 becomes dull, the entire cutter assembly may be removed and replaced with a new assembly. As in the other embodiments, the sharp edge 144 is spaced apart from the external surface 203, 205 of the housings so as to prevent the consumer from cutting their fingers on the blade 142. As in the previous embodiment, the trimmer line is folded. The folding of the line causes the line at the outer edge of the fold to become stressed, and will cause the line along the inside edge of the fold to be compressed. The folded portion is inserted into the passageway so as push the stressed outer edge of the folded line portion against the sharp edge 144. This action will readily cut the trimmer line where the blade touches the line. This method permits the user to cut the trimmer line to length for use in the channel 212. Accordingly, when the trimmer line held in channel 212 becomes frayed or shortened due to use, the user will actuate the button 216 so as to release the frayed trimmer line and then cut and insert a new cut-to-length trimmer line therein.

It should be appreciated by those skilled in the art that portions of the cutter body could be removed for the purpose of reducing material or to alter the method of holding the cutter into the trimmer head. Additionally, for any of the embodiments described, the cutter assembly and the passageway could be positioned so that the trimmer line is inserted through a top surface of the trimmer head, through a lower surface of the head, or positioned so that the passageway is angled relative to an imaginary line extending from the axis of rotation radially to the perimeter of the head.

Referring now to FIGS. 12-20, it can be seen that a second fixed-line trimmer head with an incorporated line cutter is designated generally by the numeral 300. This embodiment provides for an upper housing 302, which has an external surface 303, that is secured to a lower housing 304, which has an external surface 305, wherein the lower housing has a passageway 306. As in the previous embodiment, the upper housing is secured to the lower housing by the use of fasteners 308. A hub 310 extends from the lower housing 304 through a central opening in the upper housing 302. The underside (not shown) of the hub 310 has a hexagon-shaped cavity. A hexagon-shaped fastener is placed in the hexagon-shaped cavity for the purpose of attaching the trimmer head to the shaft of a motorized string trimmer machine.

Figure 13:
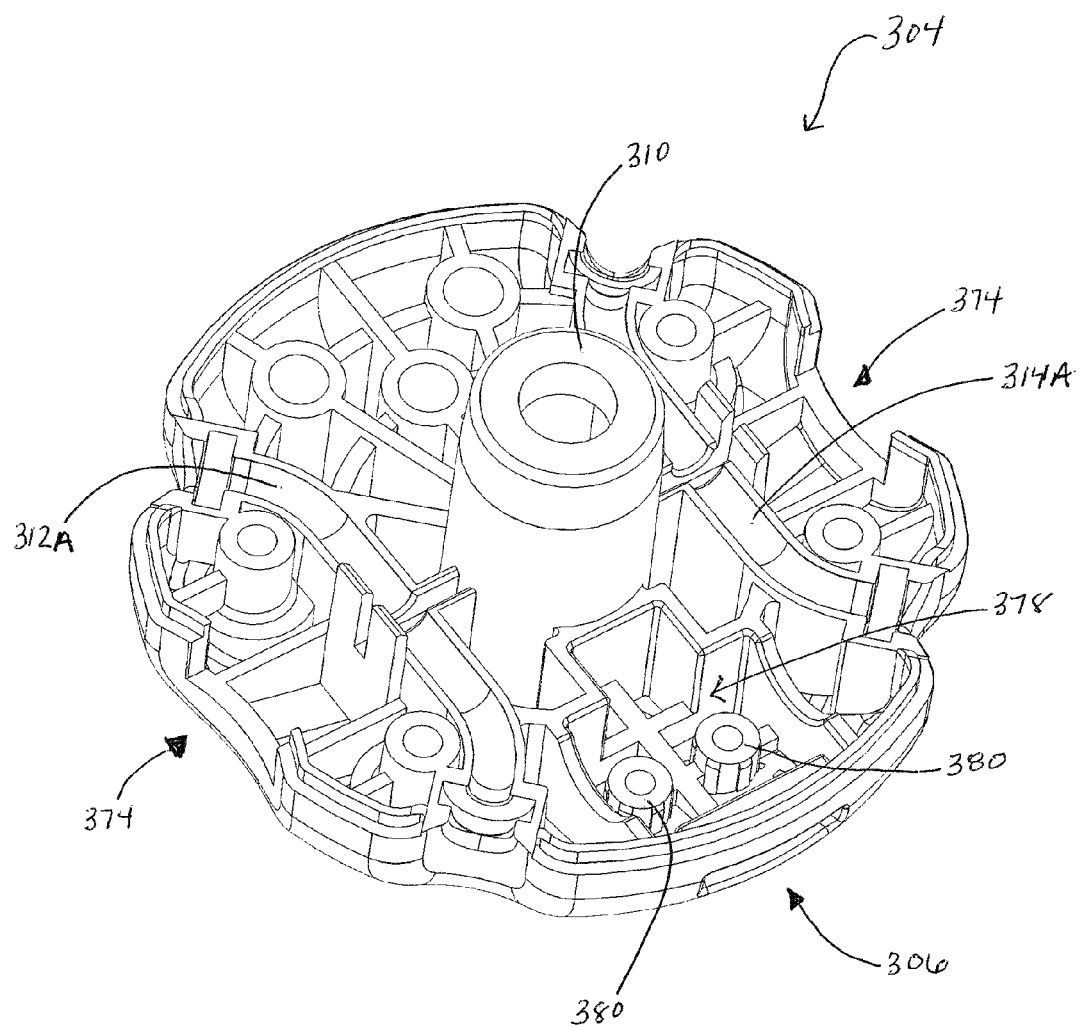
FIG. 13 is an upper perspective view of a lower housing utilized in the second alternative trimmer head according to the concepts of the present invention.
Figure 14:
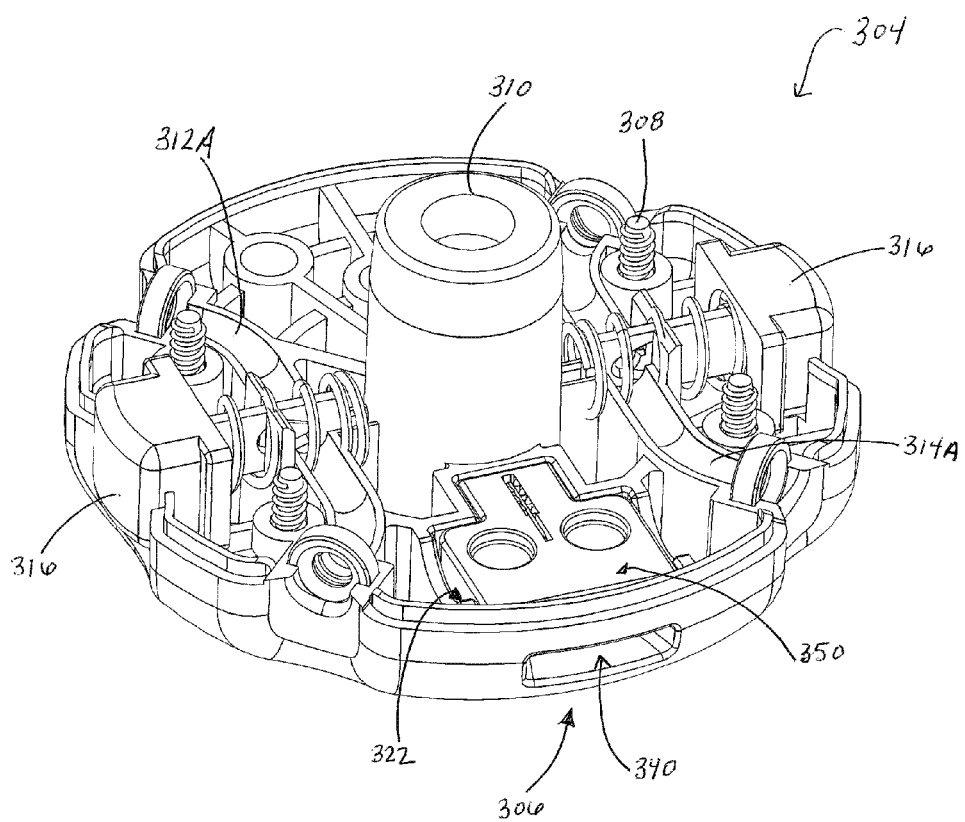
FIG. 14 is an upper perspective view of the lower housing assembly of the second alternative trimmer head with a cutter assembly installed according to the concepts of the present invention.
Figure 15:
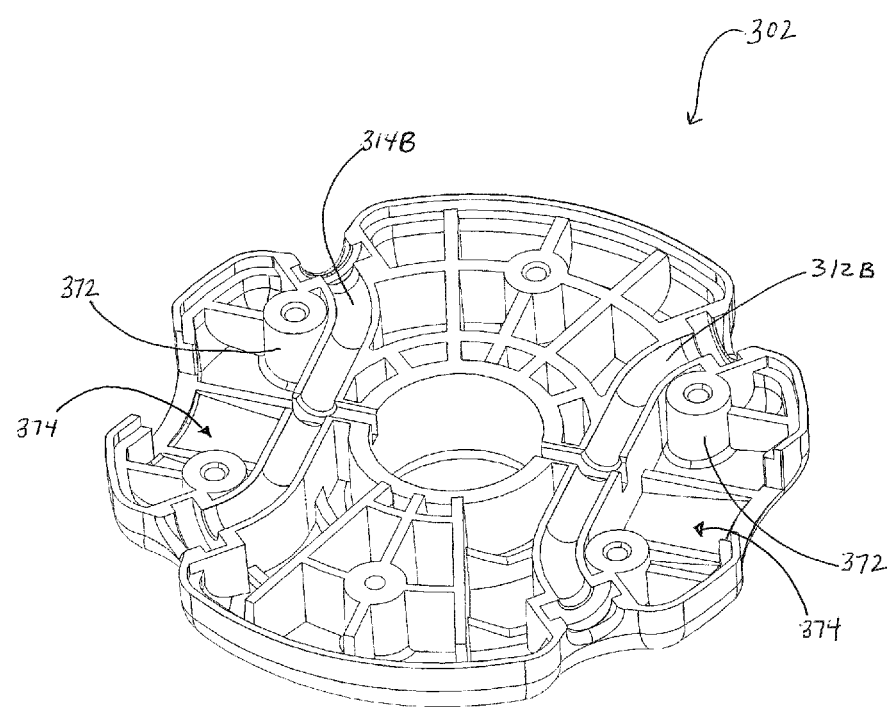
FIG. 15 is a bottom perspective view of the upper housing of the second alternative trimmer head according to the concepts of the present invention.
Figure 16:
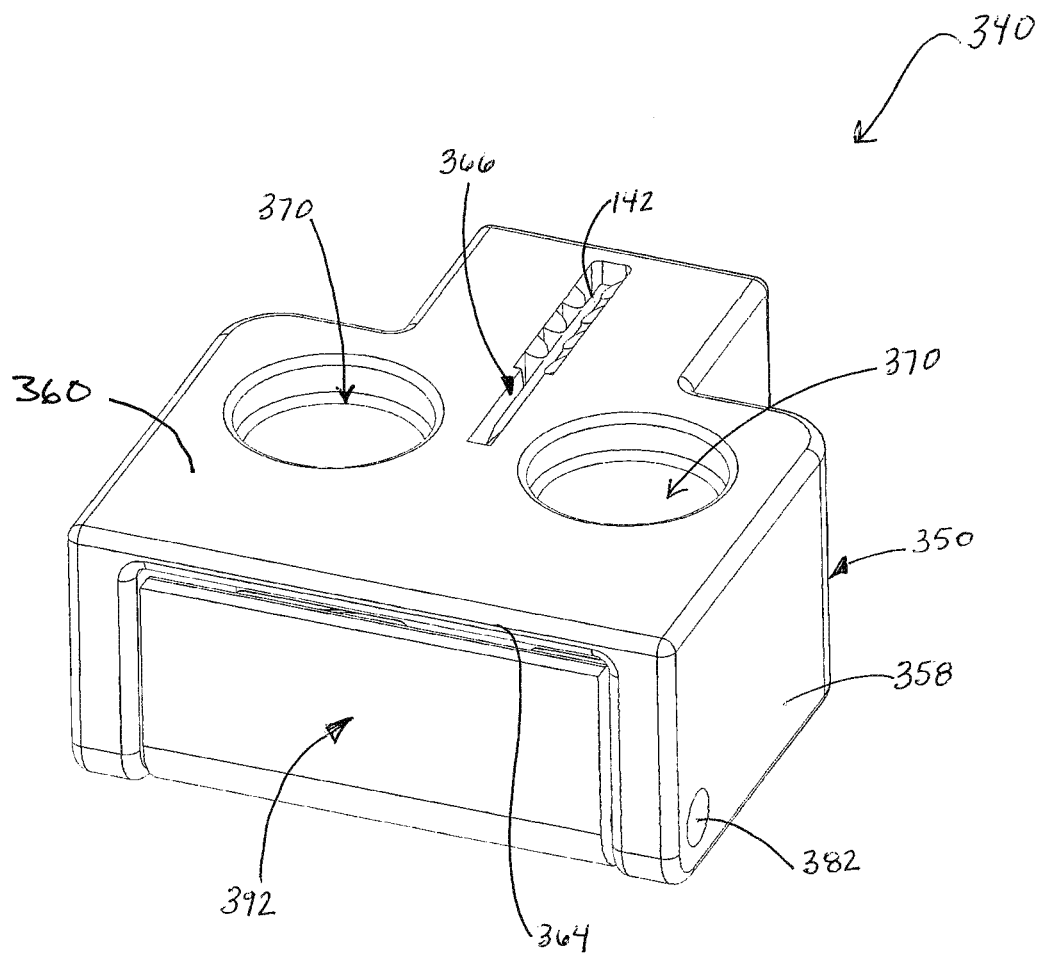
FIG. 16 is a lower perspective view of a cutter assembly with a deflectable door according to the concepts of the present invention.
Figure 17:
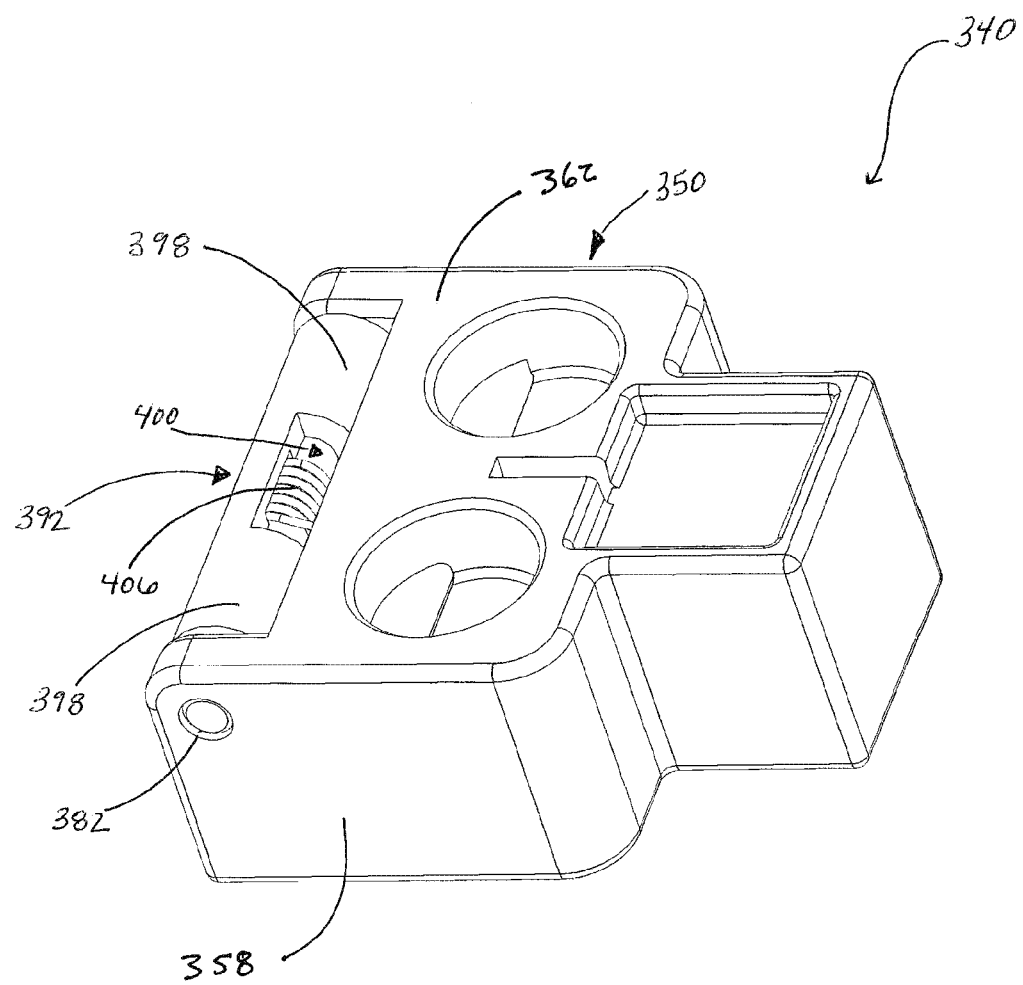
FIG. 17 is an upper perspective of the cutter assembly with the deflectable door according to the concepts of the present invention.

As best seen in FIGS. 13-15, a lower channel 312A and a lower channel 314A are provided in the lower housing 304. Likewise, an upper channel 312B and 314B are configured in the upper housing 302 such that when the upper and lower housings are combined, two curvilinear tubular passageways (312 and 314) are formed so as to allow for two trimmer lines to be captured in the trimmer head 300. In this embodiment, two trimmer line retention buttons 316 are provided at opposite sides of the housings wherein actuation of each buttons independently operates corresponding line-retention mechanism that bisect the midpoint of the two curvilinear tubular passageways. More details on the operation of this line clamping mechanism is further described in U.S. Pat. No. 6,401,344, which is incorporated herein by reference. Eyelets 320 may be provided at both ends of the channels 312 and 314. The lower housing 304 provides for a lower cutter cavity 322 which carries a cutter assembly 340. The upper housing 302 provides for posts 372 to receive the fasteners 308. Additionally, the upper housing 302 provides for button cavities 374 to receive the buttons 316.

Referring now to FIGS. 16-20, it can be seen that a cutter assembly 340 is constructed in a manner similar to that of the cutter assembly 240. In this embodiment, the cutter assembly 340 is provided with a deflectable door 392 which prevents debris and other material from entering the cutter housing. During the process of cutting vegetation with trimmer heads, debris in the form of vegetation, sand and dirt is slung in all directions. Generally the debris moves away from the trimmer head. A guard is mounted on the trimmer shaft near the trimmer head to block debris that is slung in the direction of the user. However, this debris ricochets off the guard, ground and other objects and is redirected back towards the trimmer head. Without a door located at the entrance to the cutter, this debris would enter the cutter body and dull the blade and/or otherwise accumulate in the interior of the cutter housing. Thus, adding a spring loaded door to the cutter greatly improves its function in applications where the cutter is incorporated into a trimmer head.

In the embodiments shown, the cutter door is constrained from opening outward by the interior surfaces of the housing. When the head is in use, it is spun at high speeds which creates centrifugal forces acting on the door of the cutter. This force keeps the impact of debris from opening the door and keeps the door in the closed position. However, when the trimmer head is stopped for purposes of loading new strips of trimmer line, then the centrifugal forces are not present and the user can easily push a folded length of line into the passageway 306, push open the door 392 to the cutter body, and thus push the outer-edge of the folded strip of trimmer line against the sharp edge 144 of the blade 142. The line is easily severed, generating a cut length of line ready to be loaded into the trimmer head for use.

The cutter housing 350 provides a pair of sides 358 that are connected to one another by a cutter floor 360 at a lower edge of the sides and a cutter ceiling 362 which connects the sides at an upper edge. Together the sides, floor and ceiling provide a housing front 364. In a manner opposite to the previous embodiment, the cutter floor 360 provides a recess 366 and the cutter ceiling 362 provides for a trough 368 which is aligned with the recess 366. And as in the previous embodiment, a blade 142 is received in the recess 366 and positionally maintained by the trough 368. The blade 142 provides a sharp edge 144 which substantially bisects the passageway 306 and the interior of the cutter housing 350. The exterior of the cutter housing provides for positioning cavities 370.

As seen in FIG. 13, the lower housing 304 may provide a cutter cavity 378 which may receive the cutter housing 350 such that the positioning posts 380 are receiving in the positioning cavities 370. This maintains alignment and positioning of the cutter housing 350 when the housings 302 and 304 are assembled to one another.

Figure 18:
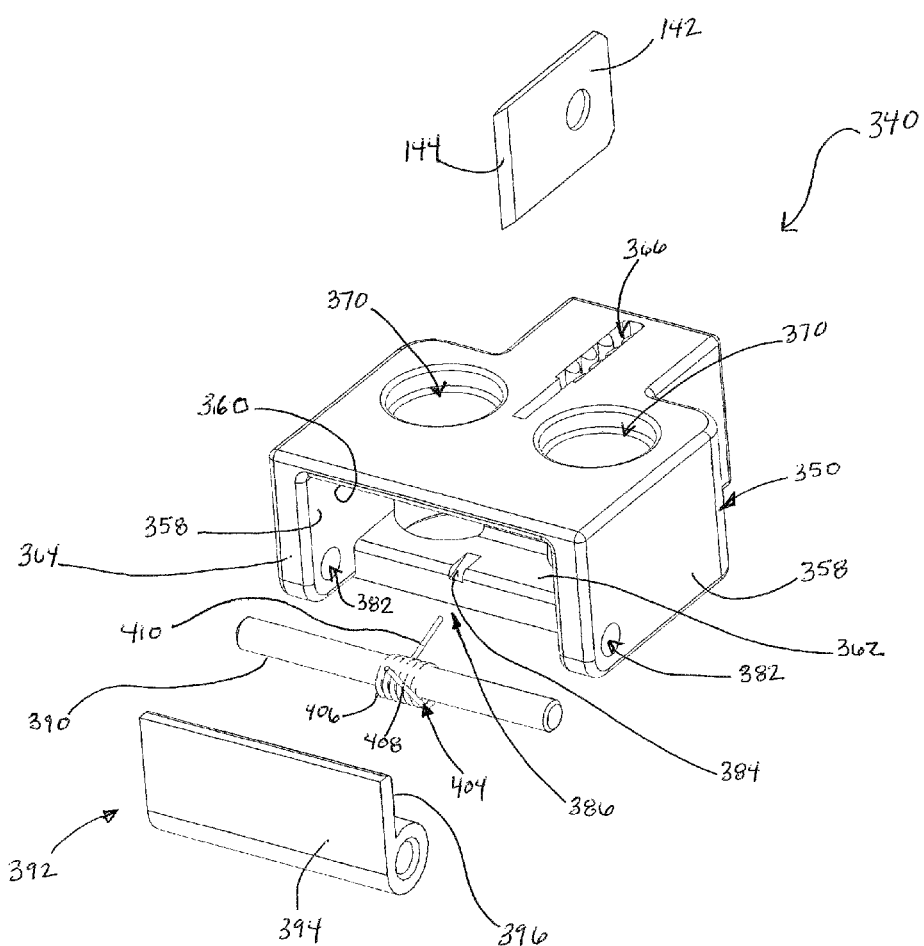
FIG. 18 is an exploded perspective view of the cutter assembly with the deflectable door according to the concepts of the present invention.
Figure 19:
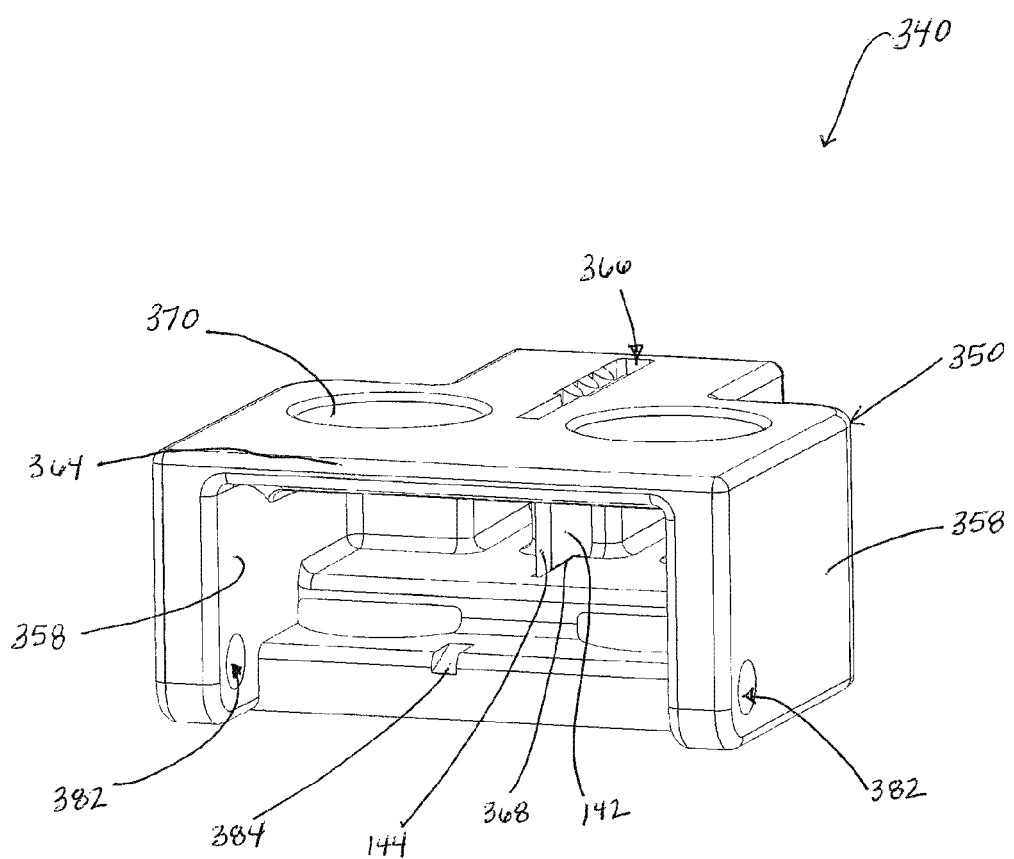
FIG. 19 is a front perspective view of a cutter assembly according to the concepts of the present invention with the deflectable door assembly removed.
Figure 20:
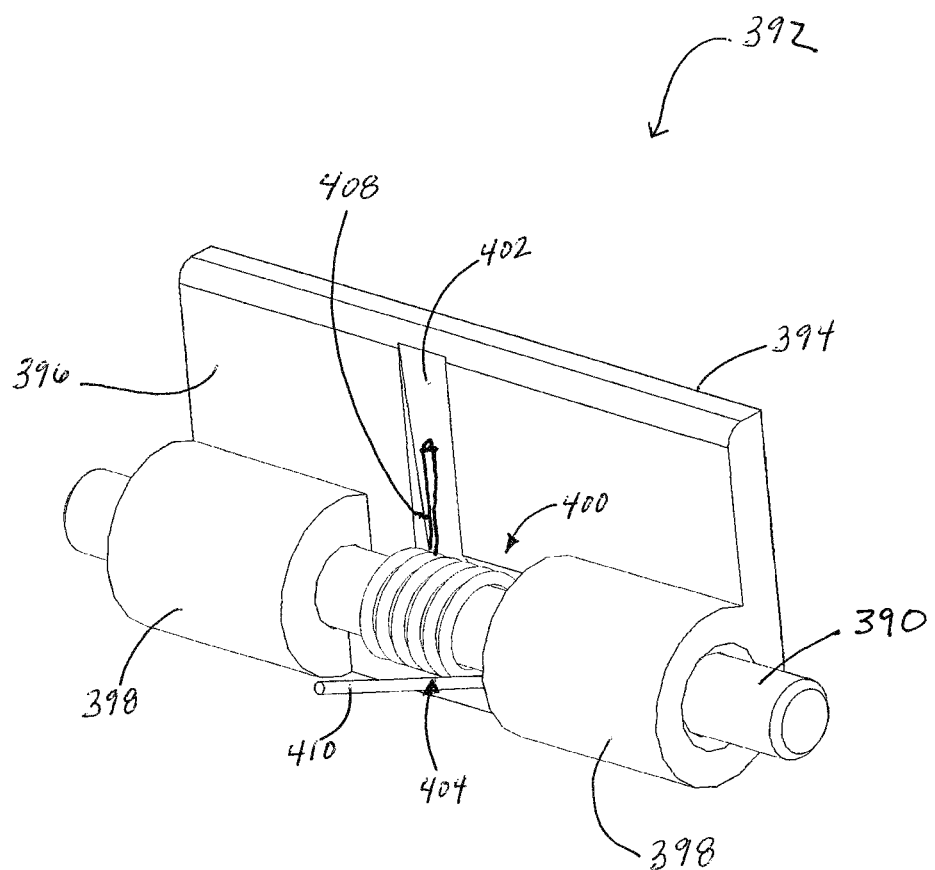
FIG. 20 is a rear perspective view of the deflectable door utilized in the cutter assembly according to the concepts of the present invention.

As best seen in FIGS. 18-20, the cutter housing 350, and in particular the sidewalls 358, may be provided with pin holes 382 that are opposed to one another. The cutter ceiling may provide for a spring catch 384. Additionally, the cutter ceiling provides for a recess 386 which is slightly removed from the housing front 364.

A door pin 390 carries a door 392 near the housing front. The door 392 may include a front panel 394 and a rear panel 396. Extending from a top edge of the rear panel are a pair of opposed pin collars 398 which form a collar gap 400 therebetween. The rear panel 396 also provides a door catch groove 402. A spring 404 includes a coil 406 wherein a door end 408 extends from one side of the coil while a housing end 410 extends from an opposite end of the coil. The coil 406 may be positioned at about a midpoint of the pin 390. Moreover, the pin is inserted through the pin collars so that the coil 406 is positioned within the collar gap 400 between the pin collars 398. With the ends of the pin inserted into and held by the respective pin holes 382 of the sidewalls of the cutter housing 350, the door substantially covers the opening of the cutter housing. The spring 404 is positioned so as to allow the door 392 to pivot about the pin and deflect inwardly whenever a force is applied. As such, insertion of the folded trimmer into the passageway 306 will deflect the door inwardly so that the stressed outer-edge of the folded portion of trimmer line can be pushed into the sharp edge 144 of the blade 142 and thus sever the trimmer line.

This embodiment is similar to the other embodiments in that a cutter housing could be maintained in either the upper housing, the lower housing or possibly therebetween. The door 392 is recessed from the surfaces 303, 305 of the housings and provides an advantage over the other embodiment in that the door prevents debris from entering the cutter housing 350 which may otherwise dull the blade.

Figure 21:
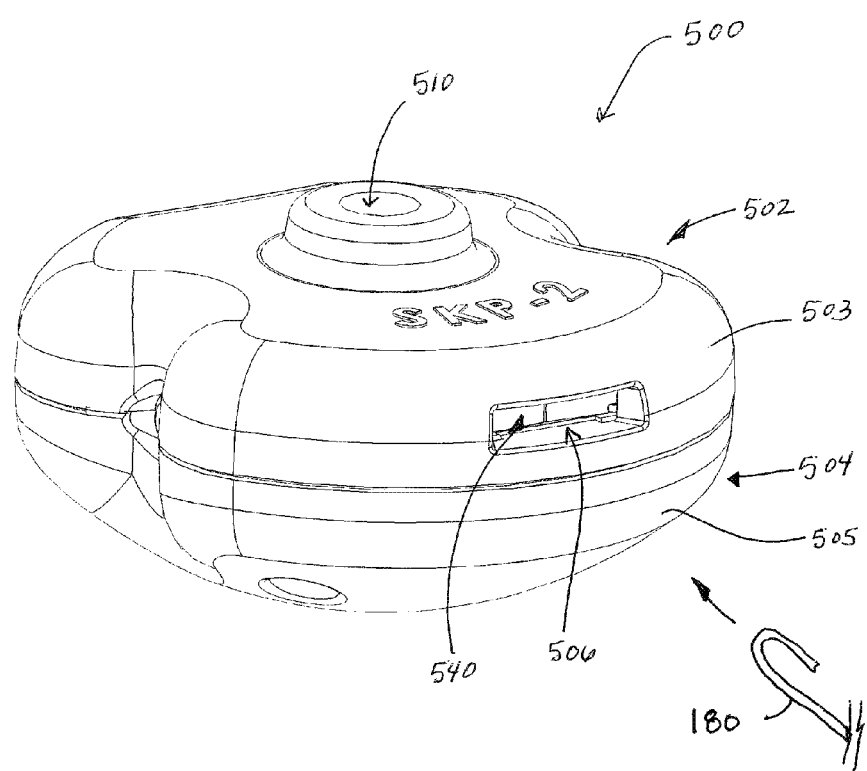
FIG. 21 is a perspective view of a third alternative embodiment of a fixed-line trimmer head with an incorporated line cutter according to the concepts of the present invention.
Figure 22:
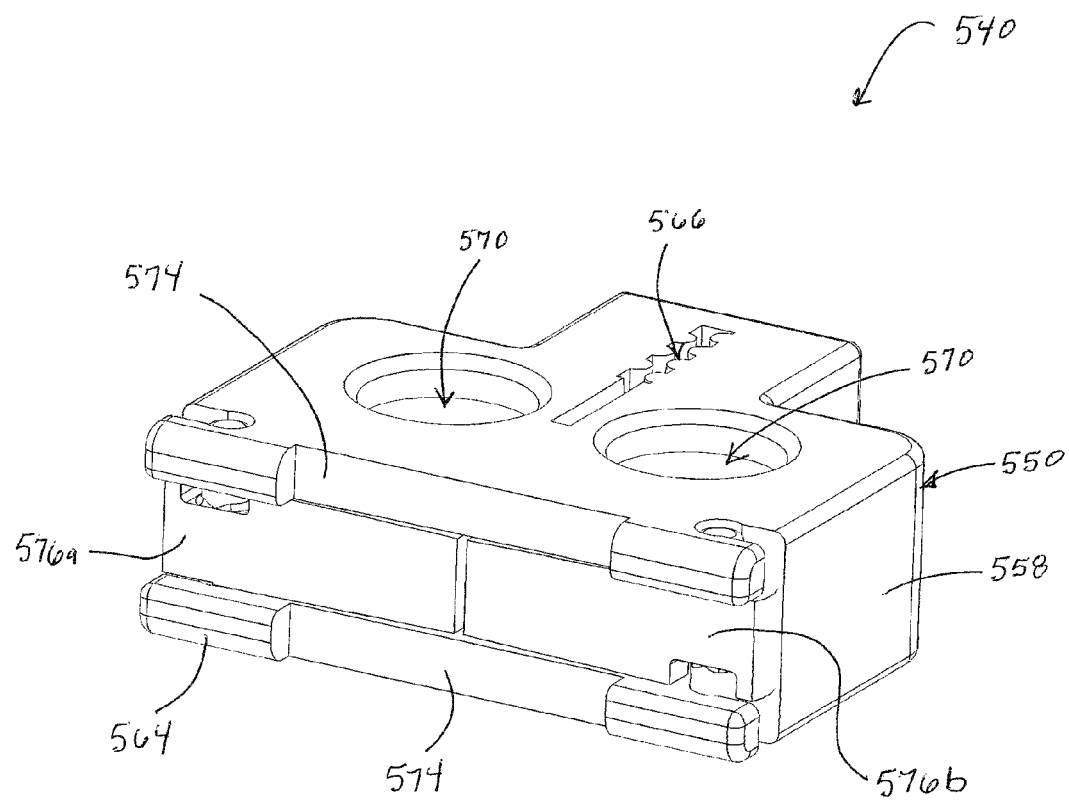
FIG. 22 is a perspective view of a cutter assembly with side-by-side deflectable doors used in the third alternative embodiment of the trimmer head according to the concepts of the present invention.
Figure 23:
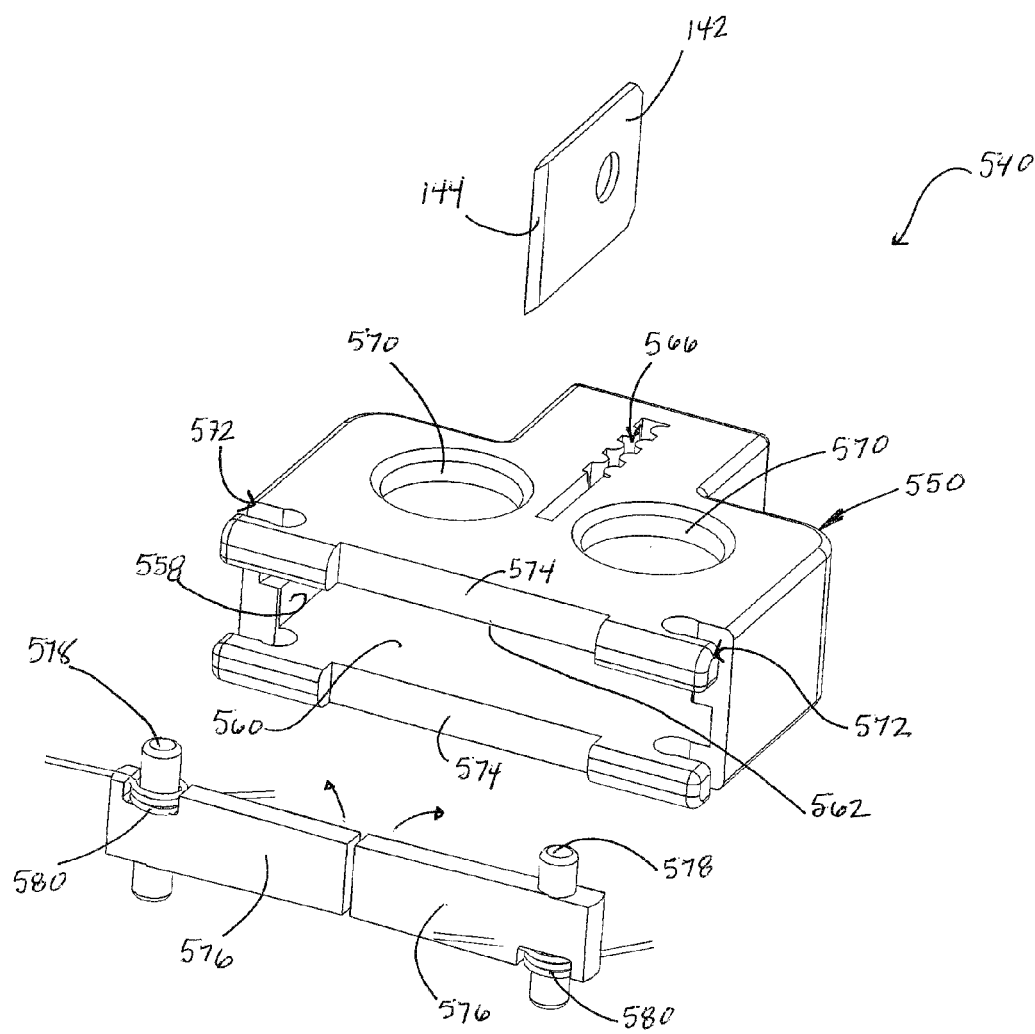
FIG. 23 is an exploded perspective view of the cutter assembly shown in FIG. 22 according to the concepts of the present invention.

Referring now to FIGS. 21-23, a trimmer head with an incorporated line cutter is designated generally by the numeral 500. The trimmer head provides for an upper housing 502 which has an external surface 503 that is securable to a lower housing 504 which has an external surface 505. The upper housing 502 provides for a passageway 506, but it will be appreciated that the passageway 506 may also be provided in the lower housing 504. In other words, the passageway 506 may extend from either external surface 503 or 505. As in the other embodiments, a threaded fastener in placed inside of the head. The stem of the trimmer motor extends through the passageway 510 and is threaded to the fastener for the purpose of attaching the trimmer head to the motor shaft of the trimmer machine. The trimmer head 500 is similar to the trimmer head 200 and provides similar holding mechanisms for the trimmer line and the like. As such, those features are not described in regard to this embodiment.

The passageway 506 provides access to a cutter assembly 540 that is recessed from the external surfaces of the housings 502 and/or 504. The cutter assembly 540 provides for a double door, or side-by-side doors wherein the two doors deflect inwardly along the sides of a cutter housing 550. As best seen in FIGS. 22 and 23, the cutter housing 550 provides for sides 558 that are connected to one another by a floor 560 and a ceiling 562. The cutter housing provides for a front 574 which is recessed from the external surfaces 503,505 of the housings 502 and 504.

The ceiling 562 has a recess 566 therethrough that is positioned away from the front 574. As in the other embodiments, the recess 566 receives the blade 142 which has a sharp edge 144. The exterior surface of the cutter housing 550 provides for positioning cavities 570 that are received in corresponding positioning posts provided by either of the housings 502 or 504.

Each side 558 provides for a hinge cavity 572 which may be recessed from the front 574 at the floor 560 and at the ceiling 562. Each hinge 578 carries a door 576. Each door provides for a spring hinge 580 such that the door is deflectable inward when a force is applied to an outer surface of each door. As such, insertion of a folded trimmer line will deflect either one or both of the doors 576 inwardly so that the outer-edge of a folded portion of trimmer line may engage the sharp edge 144 and be cut. This embodiment provides for many of the same advantages as the other embodiments. Use of the double door configuration allows for a reduced height configuration of the cutter housing in comparison to the other embodiment which utilizes a single door that is secured to the floor.

In the embodiments numbered 200, 300 and 500, the line clamping mechanism in the trimmer heads were based upon the prior art in U.S. Pat. Nos. 6,401,344 and 7,111,403. However, the line cutters discussed in this invention could likewise be incorporated into trimmer heads utilizing other clamping means. Some alternate clamping means are taught in the following U.S. Pat. Nos. 5,758,424; 5,887,348; 5,896, 666; 6,347,455; 6,519,857; 6,581,292; 6,928,741; 6,944, 956; 6,983,543; 7,000,324; 7,111,403; 4,411,069; 7,257,898; 7,536,792; and 8,307,558.

Other embodiments are possible yet not shown. For example, the trimmer head could be constructed with just one housing, and the passageway for inserting the folded trimmer line could be located in a sidewall of the one housing. The housing could have a cavity accessible from the top surface for inserting or fastening a line cutter. The cutter could be held in place with a snap fit, a fastener, or by using a welding or gluing means. Or the cutter could be held in place using centrifugal forces.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A trimmer head capable of rotational trimming, the trimmer head comprising: an upper housing;
   a lower housing secured to said upper housing, wherein either said upper housing or said lower housing has a passageway; and
   a cutter assembly maintained in said passageway, said cutter assembly having a knife, wherein trimmer line inserted into said passageway is cut by said knife.

2. The trimmer head according to claim 1, wherein said knife is recessed within said passageway.

3. The trimmer head according to claim 2, wherein said passageway is wider in a first orientation than in a second orientation and said knife is oriented in said second orientation.

4. The trimmer head according to claim 3, wherein said upper housing maintains said passageway.

5. The trimmer head according to claim 4, wherein said upper housing comprises:
   a body having a facing surface which has a recess therethrough contiguous with said passageway, wherein said knife is frictionally held in said recess and extends into said passageway.

6. The trimmer head according to claim 5, wherein said body has a trough contiguous with said passageway and aligned with said recess, and wherein said knife is received in said trough.

7. The trimmer head according to claim 3, further comprising:
   a cutter assembly maintained in said passageway, said cutter assembly having a cutter cavity aligned with said passageway.

8. The trimmer head according to claim 7, wherein said cutter assembly comprises:
   a cutter housing having a pair of opposed cutter sides, said sides connected to one another by a cutter ceiling and a cutter floor, either said cutter ceiling or said cutter floor having a recess which frictionally holds said blade in said cutter cavity.

9. The trimmer head according to claim 8, wherein said cutter housing is detachably removable from either said upper housing or said lower housing.

10. The trimmer head according to claim 8, wherein said cutter housing has a deflectable door that selectively closes said cutter cavity.

11. The trimmer head according to claim 8, wherein said cutter housing has a pair of inwardly deflectable doors that selectively close said cutter cavity.

12. The trimmer head according to claim 1, wherein an outer edge of the folded trimmer line is inserted into said passageway and cut into two pieces by a sharp edge of said knife.

13. A rotary trimmer head for a string trimmer, comprising:
    at least one rotatable housing having a passageway inwardly extending from an external surface of said at least one rotatable housing; and
    a knife maintained within said passageway, wherein said knife is adapted to cut a trimmer line inserted into said passageway.

14. The rotary trimmer head according to claim 13, wherein said knife is recessed within said passageway away from said external surface.

15. The rotary trimmer head according to claim 13, wherein said at least one housing has a facing surface substantially perpendicular to said external surface, said facing surface having a recess extending therethrough that is contiguous with said passageway, and wherein said recess frictionally holds said knife in said passageway.

16. The rotary trimmer head according to claim 13, further comprising:
    a cutter housing disposably received in said at least one housing, said cutter housing having opposed side walls connected to each other by a floor and a ceiling that are opposed to one another, said sidewalls, said floor and said ceiling forming a cutter cavity aligned with said passageway, wherein said knife extends between said floor and said ceiling.

17. The rotary trimmer head according to claim 16, further comprising:
    a spring-biased door associated to either said floor or said ceiling and which covers said cutter cavity and which is held in a normally closed position.

18. The rotary trimmer head according to claim 16, further comprising:
    a pair of spring-biased doors, each said door connected to a corresponding sidewall of said cutter housing, wherein said pair of spring-biased doors cover said cutter cavity.

19. The trimmer head according to claim 13, wherein a folded strip of the trimmer line is cut when an outer edge of the folded strop is inserted into said passageway.

20. A method of cutting a length of trimmer line, using a rotary trimmer head having a passageway with a recessed knife, the method comprising:
    folding a trimmer line;
    inserting said folded trimmer line into the passageway to engage the recessed knife; and
    cutting said folded trimmer line into two pieces of trimmer line.

21. The method according to claim 20, further comprising:
    withdrawing said two pieces of trimmer line from the passageway.

22. The method according to claim 21, further comprising:
    pressing the folded trimmer line against a spring-biased door maintained in said passageway.

23. The method according to claim 20, further comprising:
    inserting an outer edge of said folded trimmer line against a sharp edge of the recessed knife; and withdrawing said cut pieces of said trimmer line from the passageway.

\* \* \* \* \*